US010507938B2

(12) United States Patent
Raz et al.

(10) Patent No.: US 10,507,938 B2
(45) Date of Patent: Dec. 17, 2019

(54) METHODS AND SYSTEMS OF ANCHORING AN UNMANNED AERIAL VEHICLE ON A GROUND STATION

(71) Applicant: Percepto Robotics Ltd, Modiln (IL)

(72) Inventors: Raviv Raz, Doar-Na Lachish Darom (IL); Jonathan Jaffe, Jerusalem (IL); Sagi Blonder, Ness Ziona (IL)

(73) Assignee: Percepto Robotics Ltd, Modiln (IL)

( * ) Notice: Subject to any disclaimer, the term of this patent is extended or adjusted under 35 U.S.C. 154(b) by 0 days.

(21) Appl. No.: 16/064,465

(22) PCT Filed: Jul. 20, 2017

(86) PCT No.: PCT/IL2017/050821
§ 371 (c)(1),
(2) Date: Jun. 21, 2018

(87) PCT Pub. No.: WO2018/015960
PCT Pub. Date: Jan. 25, 2018

(65) Prior Publication Data
US 2019/0002128 A1    Jan. 3, 2019

Related U.S. Application Data

(60) Provisional application No. 62/364,855, filed on Jul. 21, 2016.

(51) Int. Cl.
*B64F 1/22* (2006.01)
*B64F 1/00* (2006.01)
(Continued)

(52) U.S. Cl.
CPC .............. *B64F 1/12* (2013.01); *B64C 39/024* (2013.01); *B64F 1/007* (2013.01); *B64F 1/125* (2013.01);
(Continued)

(58) Field of Classification Search
CPC .. B64F 1/007; B64F 1/125; B64F 1/22; B64C 2201/066; B64C 2201/18
See application file for complete search history.

(56) References Cited

U.S. PATENT DOCUMENTS 3,553,633 A    1/1971   Ondrejka
9,376,208 B1   6/2016   Gentry
(Continued)

FOREIGN PATENT DOCUMENTS

CN        104979882       10/2015
CN        205004789        1/2016
WO    WO 2018/015960       1/2018

OTHER PUBLICATIONS

International Search Report and the Written Opinion dated Oct. 18, 2017 From the International Searching Authority Re. Application No. PCT/IL2017/050821. (19 Pages).
(Continued)

*Primary Examiner* — Richard R. Green (57) ABSTRACT

An unmanned aerial vehicle (UAV) ground station, comprising: a landing surface having a perimeter and a center; a plurality of pushers held above the landing surface by a plurality of linear actuators; at least one electro-mechanical connector attached to one of the plurality of pushers, mechanically adapted to be electrically connected to a compatible electro-mechanical connector of a UAV; and a landing detection controller adapted to instruct the plurality of linear actuators to move the plurality of pushers simultaneously from the perimeter toward the center when a landing event related to the UAV is detected.

10 Claims, 9 Drawing Sheets

(51) Int. Cl.
*B64F 1/12* (2006.01)
*B64C 39/02* (2006.01)
*B64F 1/20* (2006.01)
*G05D 3/10* (2006.01)
*H02J 7/00* (2006.01)

(52) U.S. Cl.
CPC ............... *B64F 1/205* (2013.01); *G05D 3/10* (2013.01); *B64C 2201/024* (2013.01); *B64C 2201/027* (2013.01); *B64C 2201/20* (2013.01); *H02J 7/0042* (2013.01)

(56) References Cited

U.S. PATENT DOCUMENTS

| | | | |
|---|---|---|---|
| 9,387,940 B2 * | 7/2016 | Godzdanker | ........... B64F 1/125 |
| 2014/0124621 A1 | 5/2014 | Godzdanker et al. | |
| 2016/0023762 A1 | 1/2016 | Wang | |

OTHER PUBLICATIONS

Iniparam2k "My Homemade RC Helipad", YouTube Blog, Sep. 6, 2013.
Wikipedia "Anti-Reflective Coating", Wikipedia, the Free Encyclopedia, 5 P., Jun. 11, 2016.
International Preliminary Report on Patentability dated Jan. 31, 2019 From the International Bureau of WIPO Re. Application No. PCT/IL2017/050821. (13 Pages).

\* cited by examiner

METHODS AND SYSTEMS OF ANCHORING AN UNMANNED AERIAL VEHICLE ON A GROUND STATION

FIELD AND BACKGROUND OF THE INVENTION

The present invention, in some embodiments thereof, relates to an unmanned aerial vehicle (UAV) ground station and, more particularly, but not exclusively, to anchoring a UAV to a ground station when landed.

An unmanned aerial vehicle (UAV), commonly known as a drone and referred to as a Remotely Piloted Aircraft (RPA) by the International Civil Aviation Organization (ICAO), is an aircraft without a human pilot aboard. Its flight is controlled either autonomously by onboard computers or by the remote control of a pilot on the ground or in another vehicle. The typical launch and recovery method of an unmanned aircraft is by the function of an automatic system or an external operator on the ground.

Drones of commercial value are the result of recent advances in microprocessors, GPS, sensors, batteries, motors, lightweight structural materials, and advanced manufacturing techniques. Commercially utilized UAVs may efficiently perform surveillance, mapping, monitoring, tracking, videography, logistics operations and other tasks without extended effort or human risk. However, typically, UAVs are remote controlled, thus necessitating an operator to control the movements of the UAV and its landing process. This becomes problematic, however, when the UAV is deployed over obscured areas of land and/or requires intensive, long-range remote control scenarios that often include the need to remotely land a UAV (e.g., in order to recharge or replace a battery). The remote landing process for an operator, however, is often difficult, error-prone and task-dependent, which increases the probability of damaging or destroying a UAV, resulting in considerable expense. In addition, a damaged UAV may delay a project, causing additional time and expense. Using conventional UAV systems, some operators may become fairly proficient in remotely landing a UAV. Frequently, however, an operator requires extensive training and practice to be able to successfully remotely land a UAV on a consistent basis. The time and expense required to train an operator to perform remote UAV landings is cost prohibitive to many companies that would benefit from the use of a UAV. Moreover, even when adequately trained, an operator still has a fairly high risk of damaging or destroying a UAV during a remote UAV landing.

A UAV ground station is an apparatus from which a UAV may takeoff, land and/or be stored until its next flight. The UAV ground station may include a shell containing a UAV storage area that functions as a takeoff area and/or a landing pad when the UAV is not being stored. Ground control stations may also control the UAV during a manual mode of operation, mostly to assist a manual operation and landing of the UAV.

SUMMARY OF THE INVENTION

According to an aspect of some embodiments of the present invention there is provided an unmanned aerial vehicle (UAV) ground station, comprising: a landing surface having a perimeter and a center; a plurality of pushers held above the landing surface by a plurality of linear actuators; at least one electro-mechanical connector attached to one of the plurality of pushers, mechanically adapted to be electrically connected to a compatible electro-mechanical connector of a UAV; and a landing detection controller adapted to instruct the plurality of linear actuators to move the plurality of pushers from the perimeter toward the center when a landing event related to the UAV is detected.

Optionally, the plurality of pushers includes at least two horizontally disposed pushing rods and the plurality of linear actuators include a plurality of vertical rods, each of the plurality of vertical rods is attached to an end of one of the at least two horizontally disposed pushing rods.

Optionally, the plurality of pushers includes a first pair of pushing rods and a perpendicular second pair of pushing rods, wherein the first pair of pushing rods is located above the second pair of pushing rods to allow simultaneous movement of the first and second pairs of pushing rods and toward the center.

More optionally, the plurality of linear actuators move each of the first pair of pushing rods and the second pair of pushing rods simultaneously from the perimeter toward the center.

Optionally, the electro-mechanical connector includes a set of horizontally aligned teeth adapted to be mechanically combined and electrically coupled to a matching set of horizontally aligned teeth of the compatible electro-mechanical connector.

Optionally, the plurality of linear actuators move the plurality of pushers until the UAV is held by the plurality of pushers.

Optionally, when the UAV is held by the plurality of pushers, the at least one electro-mechanical connector is electrically and mechanically connected to the compatible electro-mechanical connector of the UAV, so the UAV is electronically communicating and electrically charging via the electro-mechanical connector.

Optionally, the UAV further comprises an enclosure having an open position and a closed position; wherein the landing detection controller is further adapted to instruct the enclosure to move from the open position to the closed position when the landing event is detected.

Optionally, the UAV further comprises a back-light located below the landing surface and illuminating the landing surface; wherein the landing surface is made of semi-transparent material so the landing surface is visible at night from above.

Optionally, the landing surface is covered with an anti-glare coating to prevent light reflections from the landing surface.

Optionally, the UAV includes an electronic power switching mechanism adapted to disconnect a power source of the UAV from electronic components of the UAV and connect the power source to the compatible electro-mechanical connector for charging.

According to an aspect of some embodiments of the present invention there is provided a method of anchoring an unmanned aerial vehicle (UAV) to a UAV ground station, comprising: detecting a landing event related to a UAV on a landing surface of a UAV ground station having a perimeter and a center; instructing a plurality of linear actuators to move a plurality of pushers held above the landing surface by the plurality of linear actuators, from the perimeter toward the center; and mechanically and electrically connecting at least one electro-mechanical connector attached to one of the plurality of pushers to at least one compatible electro-mechanical connector of the UAV.

Optionally, the method further comprises: charging the UAV via the at least one electro-mechanical connector.

Optionally, the method further comprises: transferring data between the UAV and the UAV ground station via the at least one electro-mechanical connector.

Optionally, the method further comprises: instructing the plurality of linear actuators to move the plurality of pushers from the center toward the perimeter to allow the UAV to be removed from the UAV ground station.

Optionally, the instructing includes: instructing the plurality of linear actuators to move a first pair of pushers of the plurality of pushers from the perimeter toward the center; and instructing the plurality of linear actuators to move a perpendicular second pair of pushers of the plurality of pushers from the perimeter toward the center; wherein the at least one electro-mechanical connector is attached to one pusher of the second pair of pushers.

Optionally, the method further comprises: applying additional pressure by the second pair of pushers on the UAV.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to an unmanned aerial vehicle (UAV) ground station and, more particularly, but not exclusively, to anchoring a UAV to a ground station when landed.

According to some embodiments of the present invention, there is provided a ground station for a UAV which includes a landing surface and pushers (for example horizontal pushing rods) that anchors the UAV when landed. When a landing event is detected by a landing detection controller, it instructs linear actuators to move the pushers simultaneously from the perimeter of the landing surface toward the center of the landing surface. The UAV is then held by the pushers at the center of the landing surface.

At least one electro-mechanical connector is attached to one of the pushers, and is connected to a compatible electro-mechanical connector of the UAV when the UAV is held by the pushers. The electro-mechanical connectors may include compatible sets of teeth to facilitate automatic connection between them when the pushers are moving towards the UAV. The electro-mechanical connectors may also include electric contacts which are attached to create electric connection between the ground station and the UAV, which allows charging of the UAV and/or direct digital communication.

The ground station may also include an enclosure which may be opened and closed by the landing detection controller to allow the UAV to land on the landing surface and protect it when not in use.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
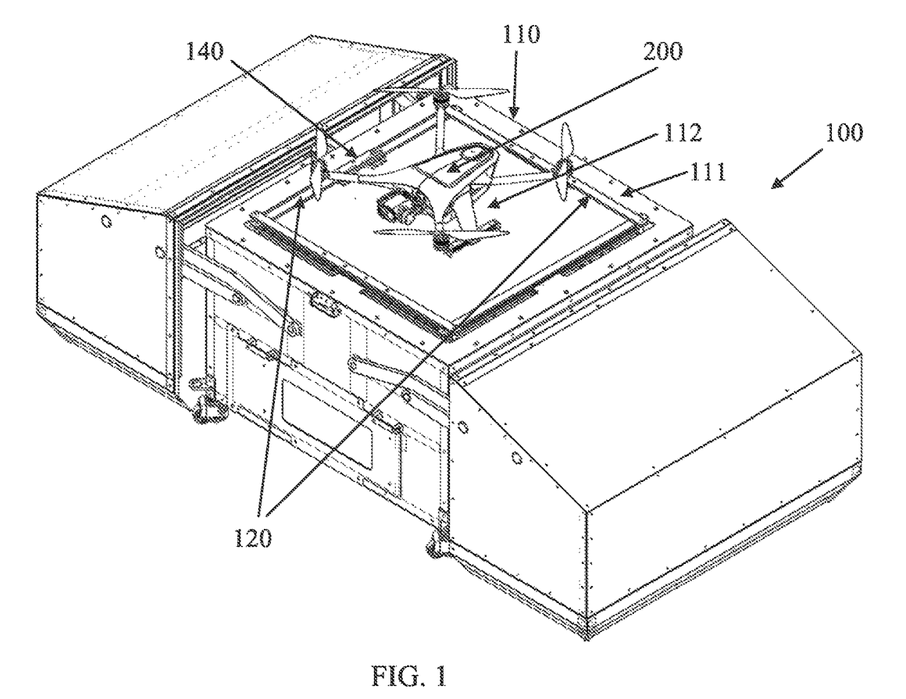
FIG. 1 is a schematic illustration of an unmanned aerial vehicle (UAV) ground station, according to some embodiments of the present invention.

Referring now to the drawings, FIG. 1 is a schematic illustration of an unmanned aerial vehicle (UAV) ground station, according to some embodiments of the present invention.

UAV 200 may include an aircraft that may be piloted autonomously or remotely by a control system. For example, a "drone" is a UAV that may be used for multiple purposes or applications (e.g., military, agriculture, surveillance, etc.). UAV 200 may include onboard computers that control the autonomous flight of the UAV. UAV 200 may include, for example, a main body, one or more rotors coupled to the main body (for example four rotors in a quadcopter UAV), a landing base and/or leg(s) coupled to the main body, an outer shell, integrated electronics, a battery bay (including a battery assembly), a global positioning system (GPS) receiver, a fixed or swappable imaging capability (e.g., a digital camera), various sensors or receivers and/or any other component. UAV 200 may also include a computing device comprising a processing unit including programmed instructions that allow the UAV to takeoff, fly, and/or land autonomously.

Ground station 100 includes a landing surface 110 having a perimeter 111 and a center 112, from which UAV 200 may takeoff, land and/or be stored until its next flight. Landing surface 110 may be of length and width of 1 meter, 1.5 meter, 2 meter or any other smaller, intermediate or larger size, for example 1350 millimeters (mm). The size of center 112 (and/or the area relevant for UAV landing) may be for example 1 meter, or any other smaller, intermediate or larger size which is smaller than landing surface 110.

Optionally, ground station 100 includes back-light for landing surface 110, such as light emitting diode (LED) array, located below landing surface 110. The back-light enables UAV 200 to see landing surface 110 at night using a regular day camera. Landing surface 110 may be made of a semi-transparent material, such as glass or semi-transparent plastic, so landing surface 110 is illuminated and visible from above through. This enables UAV 200 to easily find ground station 100 and land on landing surface 110, for example according to a pattern created by the LED array.

Optionally, landing surface 110 may be covered with an anti-glare coating, such as anti-glare paint, prevent light reflections from landing surface 110 such as sun reflection. These reflections may induce blindness of the camera or other visual sensors on UAV 200 and/or cause pixel saturation in the video frame, which may disturb the landing operation. For example, this may prevent the correct operation of computer vision algorithms used by UAV 200 for landing on landing surface 110, for example by detecting a pattern on landing surface 110.

Ground station 100 also includes a plurality of pushers 120 held above landing surface 110 by a plurality of linear actuators 130. The plurality of pushers may include two pushers, four pushers and/or any other number of pushers, optionally positioned on opposing sides of landing surface 110. Pushers 120 may be of length and width of 1 meter, 1.5 meter, 2 meter or any other smaller, intermediate or larger size, for example 1140 millimeters (mm).

Figure 2:
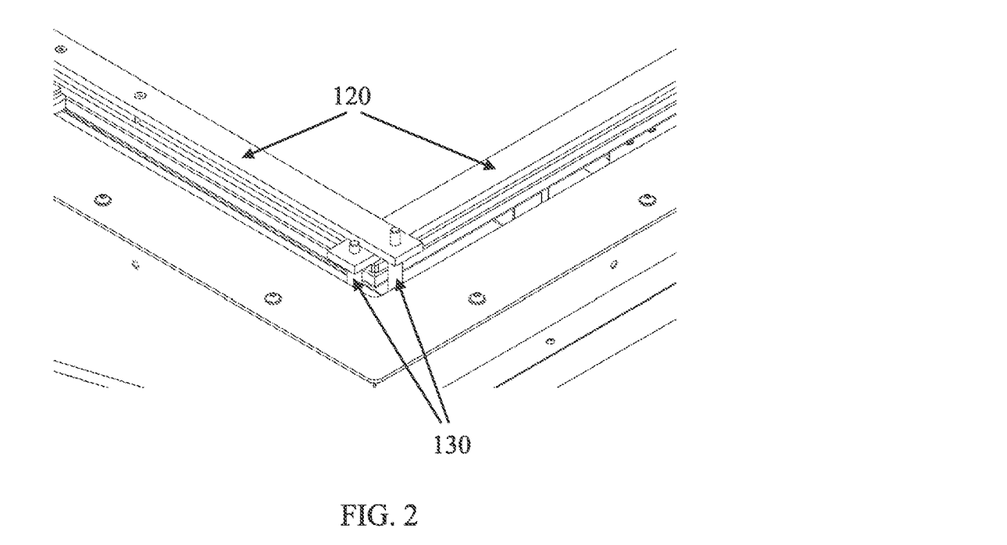
FIG. 2 is an enlarged view of pushers and linear actuators, according to some embodiments of the present invention.

Reference is now made to FIG. 2, which is an enlarged view of pushers 120 and linear actuators 130, according to some embodiments of the present invention. Optionally, pushers 120 are horizontally disposed pushing rods and are held by linear actuators 130 which include vertical rods which are attached to each end of each of pushers 120 and move horizontally. For example, the pushing rods may have flat, rectangular profile, or any other profile, and may have a length equal or smaller than the size of landing surface 110. The pushing rods may be made of rigid material such as metal or plastic, soft material such as rubber to avoid damaging the UAV, and/or any other material. The linear actuators may have, for example, round, square or any other profile and may be made of any rigid material.

Figure 3:
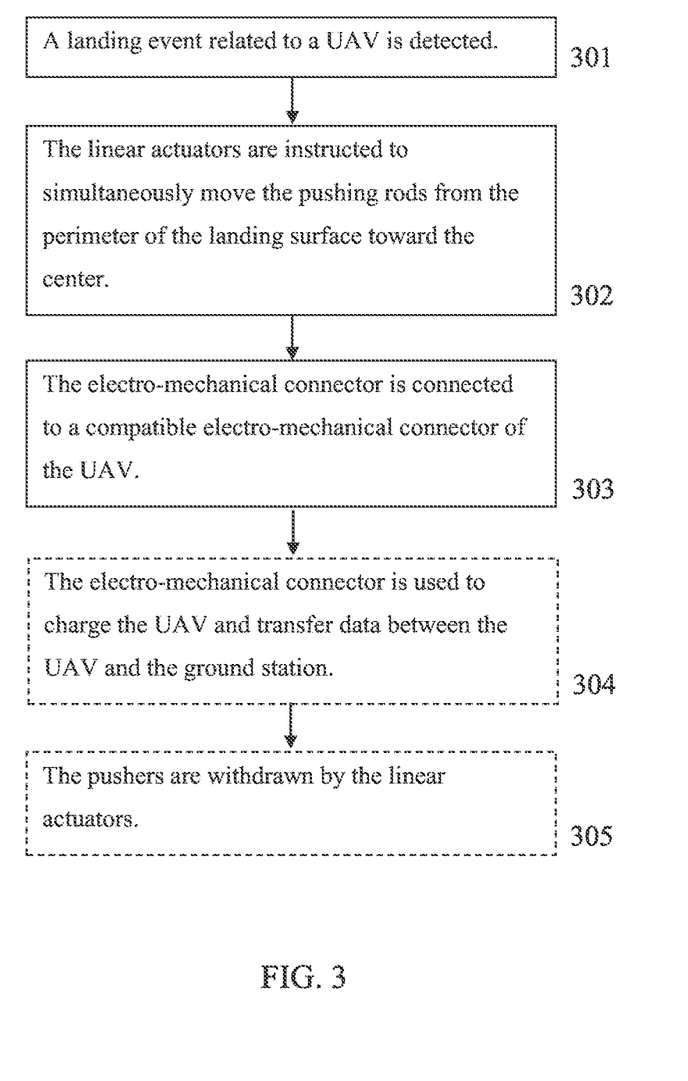
FIG. 3 is a flowchart schematically representing a method of anchoring a UAV to a ground station, according to some embodiments of the present invention.

Reference is now made to FIG. 3, which is a flowchart schematically representing a method of anchoring a UAV to a ground station, according to some embodiments of the present invention.

First, as shown at 301, a landing event related to UAV 200 is detected by a landing detection controller. The detection may be done, for example, by wireless communication between UAV 200 and ground station 100. The wireless communication may include, for example, wireless local area network (WLAN) such as Wi-Fi, a wireless personal area network (WPAN) such as Bluetooth™ protocol, cellular network protocols such as long-term evolution (LTE) and/or any other type of wireless communication. The detection may also be done, for example, by sensors such as camera(s), touch sensors, accelerometer, motion detector and/or any other sensor.

Then, as shown at 302, linear actuators 130 are instructed by a landing detection controller to move pushers 120 from perimeter 111 toward center 112.

When UAV 200 is landed on landing surface 110, linear actuators 130 move pushers 120 from perimeter 111 toward center 112, until UAV 200 is held by pushers 120. Pushers 120 may be moved sequentially, for example when each pair of pushing rods is moved separately. Pushers 120 may also be moved simultaneously, for example when all pushers are identical. Pushers 120 are moved horizontally and are pushing UAV 200 into center 112 (when UAV 200 did not land exactly in center 112).

Figure 4A:
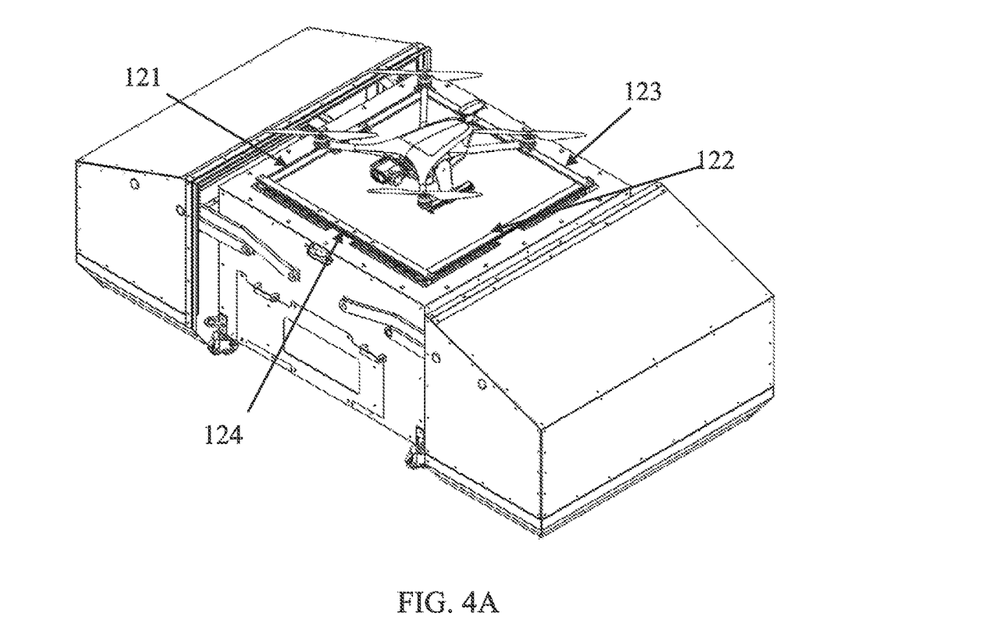
FIG. 4A and FIG. 4B are schematic illustrations of a ground station with pushers in the perimeter of the landing surface and in the center of the landing surface respectively, according to some embodiments of the present invention.
Figure 4B:
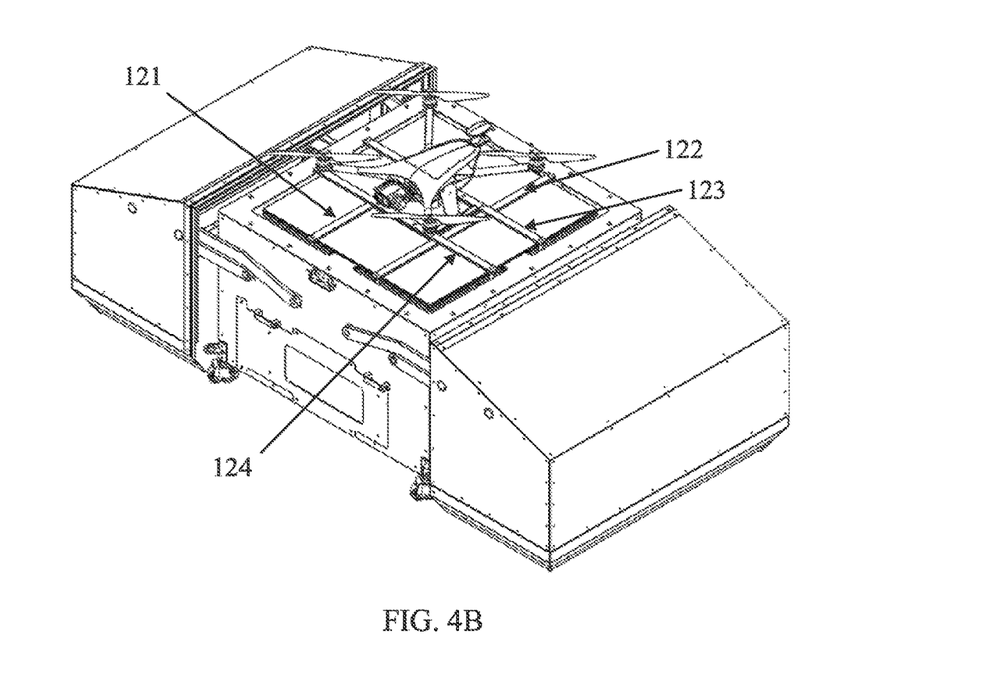
Figure 5A:
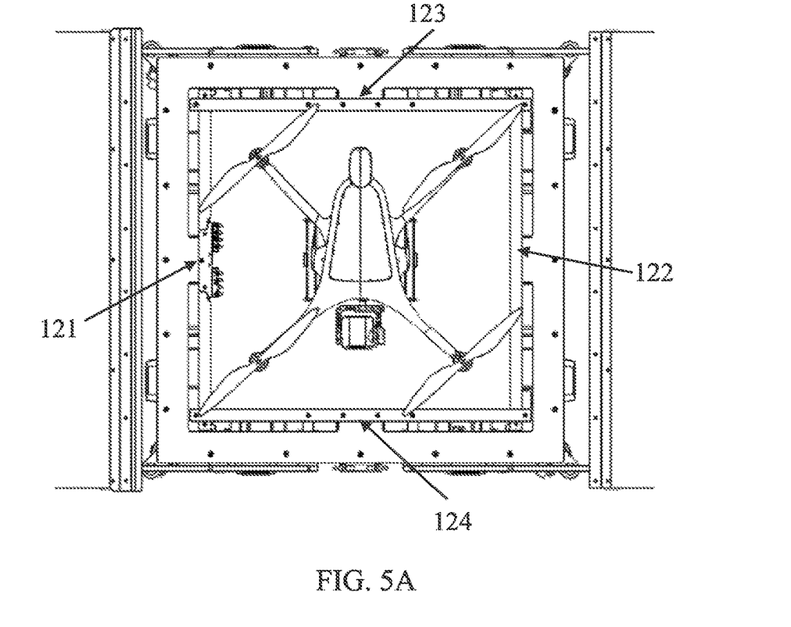
FIG. 5A and FIG. 5B are top views of a ground station with pushers in the perimeter of the landing surface and in the center of the landing surface respectively, according to some embodiments of the present invention.
Figure 5B:
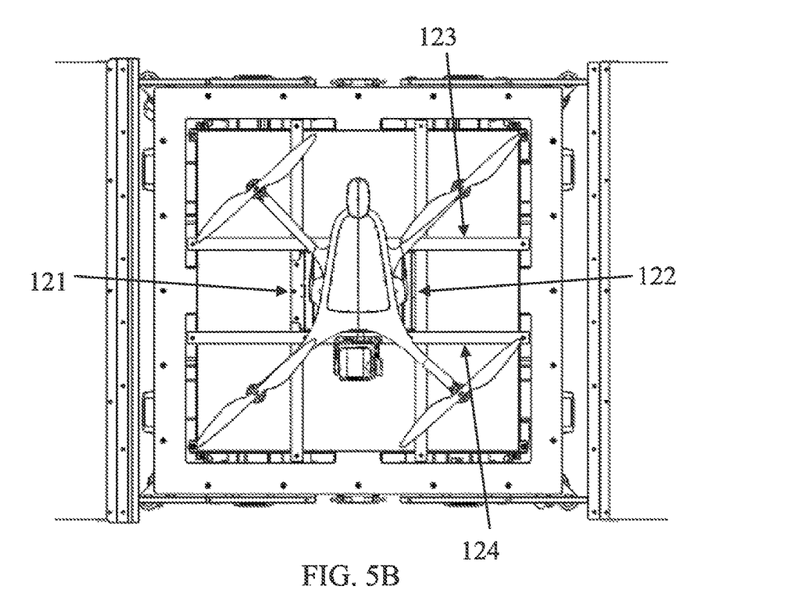

Reference is now made to FIG. 4A and FIG. 4B, which are schematic illustrations of a ground station with pushers in the perimeter of the landing surface and in the center of the landing surface respectively, according to some embodiments of the present invention. Reference is also made to FIG. 5A and FIG. 5B, which are top views of a ground station with pushers in the perimeter of the landing surface and in the center of the landing surface respectively, according to some embodiments of the present invention.

Optionally, pushers 120 includes at least one pair of horizontally disposed opposing pushers 121 and 122 and optionally a second pair of horizontally disposed opposing pushers 123 and 124 which is perpendicular to the first pair. Optionally, pushers 121 and 122 are positioned below pushers 123 and 124 to allow both pairs of pushers to move simultaneously toward center 112.

Moving linear actuators 130 may be done, for example, by a mechanism located beneath landing surface 110.

Figure 6A:
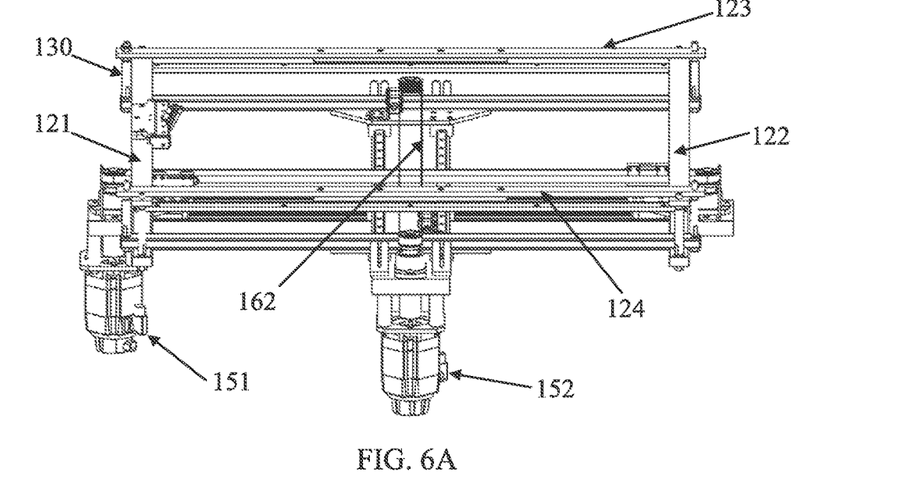
FIG. 6A and FIG. 6B are schematic illustrations of a side view and a top view of a mechanism for controlling linear actuators and pushers, according to some embodiments of the present invention.
Figure 6B:
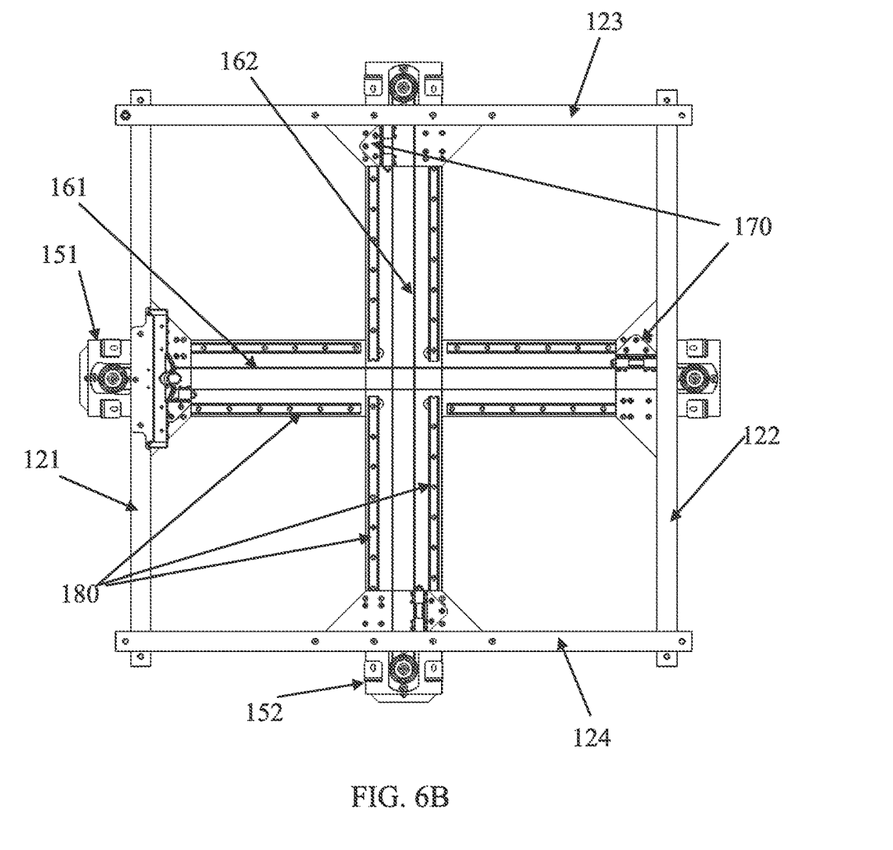

Reference is now made to FIG. 6A and FIG. 6B, which are schematic illustrations of a side view and a top view of an exemplary mechanism for controlling linear actuators and pushers, according to some embodiments of the present invention. Motors 151 and 152 are tied to and are rotating timing belts 161 and 162 respectively. Motors 151 and 152 may be connected to belts 161 and 162 by belt connectors 170. Each of timing belts 161 and 162 move one pair of horizontally disposed opposing pushers simultaneously and symmetrically via linear actuators 130. Timing belt 161 moves pushers 121 and 122 and timing belt 162 moves pushers 123 and 124. The mechanism may also include linear guides 180 to maintain linear motion of pushers 120.

Optionally, the motion of linear actuators 130 is paused when UAV 200 is stationary and held by pushers 120. This may be detected by sensors, such as camera(s), motions sensor(s), pressure sensor(s) attached to pushers 120 and/or any other detection method. For example, a global encoder is used to measure the distance between the pushers as they get close to each other, and instruct linear actuators 130 to stop at a predefined distance between pushers 120. Optionally, pressure is continuously applied by pushers 120 on UAV 200 to prevent UAV 200 from moving.

Optionally, pushers 120 include two L shaped pushers which are opposite to one another and are diagonally pushed toward one another and toward center 112. Optionally, pushers 120 include two W shaped pushers which are parallel to one another. Optionally, pushers 120 include multiple elements which are simultaneously pushed from perimeter 111 toward center 112 in a shutter-like mechanism, for example in a spiral motion.

Ground station 100 also includes at least one electro-mechanical connector 140 attached to one of pushers 120, for example pusher 121, mechanically adapted to be electrically connected to a compatible electro-mechanical connector 210 of UAV 200.

Then, as shown at 303, electro-mechanical connector 140 is mechanically and electrically connected to compatible electro-mechanical connector 210. When pusher 121 is moved toward center 112, electro-mechanical connector 140 is moving toward compatible electro-mechanical connector 210. When pushers 120 are holding UAV 200, electro-mechanical connector 140 is connected to compatible electro-mechanical connector 210, so UAV 200 is electronically communicating and electrically charging via electro-mechanical connector 140.

Optionally, pressure by pushers 120 on UAV 200 is applied in stages. For example: first, pushers 123 and 124 are moved toward center 112 and apply small pressure on UAV 200 to position it; then, pushers 121 and 122 are moved toward center 112 and electro-mechanical connector 140 is connecting compatible electro-mechanical connector 210; and finally, pushers 123 and 124 apply additional pressure on UAV 200.

Optionally, as shown at 304, UAV 200 is charged and/or data is transferred between ground station 100 and UAV 200, via electro-mechanical connector 140. This may continue until the battery of UAV 200 is full and all the data is transferred. For example, data collected by the UAV (e.g., digital photographs, digital videos, sensor readings, etc.) may be downloaded to ground station 100.

Electro-mechanical connector 140 and compatible electro-mechanical connector 210 may be of any shape which allows mechanical connection, for example, a conical shape of electro-mechanical connector 140 which is inserted into a conically shaped socket of compatible electro-mechanical connector 210, or vice-versa.

Optionally, one or more electro-mechanical connectors are attached to one or more of pushers 120. For example, one electro-mechanical connectors is attached to each of four pushing rods 121, 122, 123 and 124. For another example, two electro-mechanical connectors are attached to each of pushers 121 and 122.

Figure 7A:
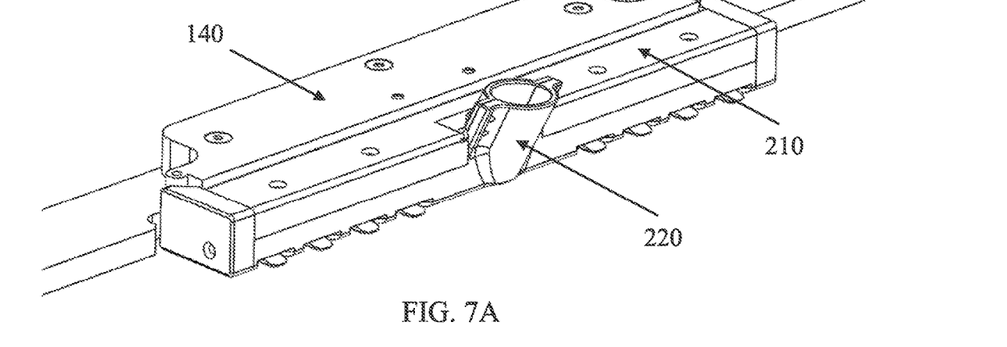
FIG. 7A and FIG. 7B are schematic illustrations of a side view and a bottom view respectively, of an electro-mechanical connector and compatible electro-mechanical connector of a UAV, when connected, according to some embodiments of the present invention.
Figure 7B:
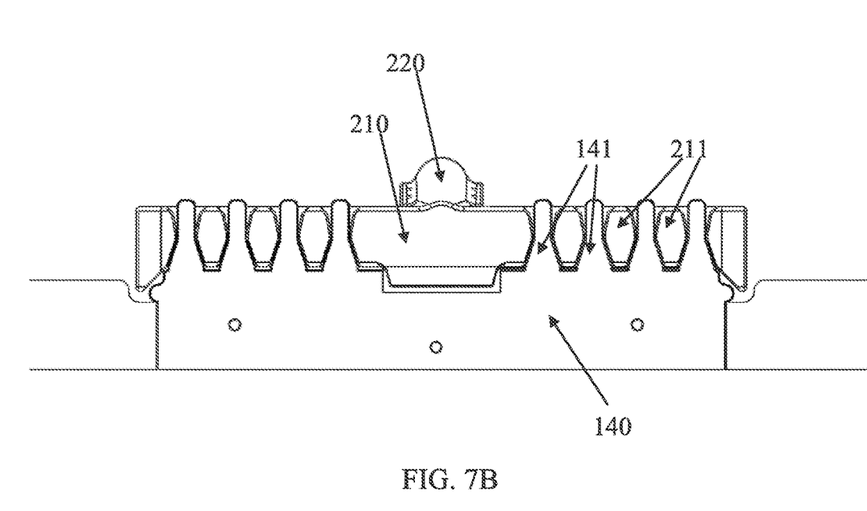
Figure 8A:
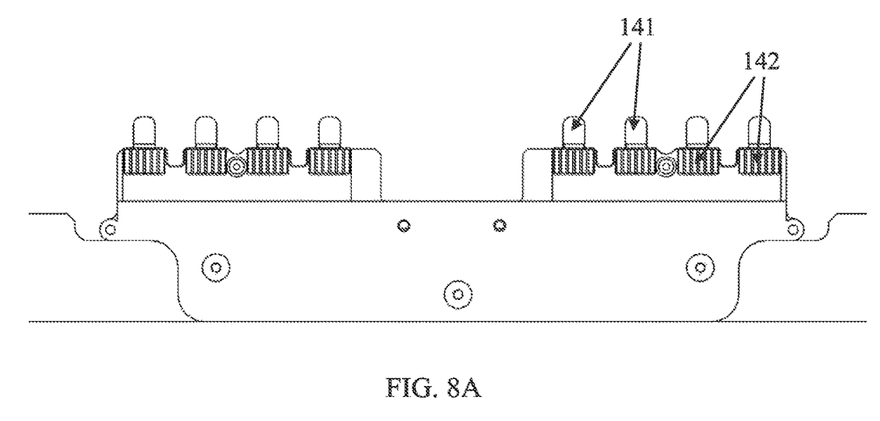
FIG. 8A and FIG. 8B are schematic illustrations of a top view and a bottom view respectively, of an electro-mechanical connector, according to some embodiments of the present invention.
Figure 8B:
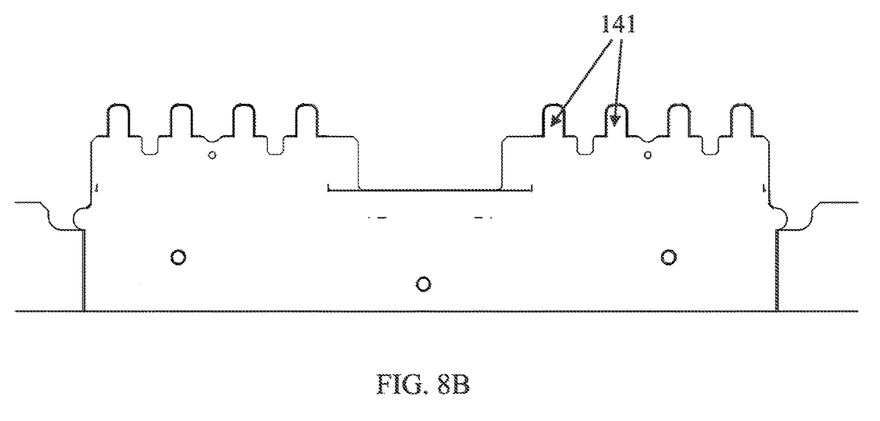

Reference is now made to FIG. 7A and FIG. 7B, which are schematic illustrations of a side view and a bottom view respectively, of electro-mechanical connector 140 and compatible electro-mechanical connector 210 of UAV 200, when connected, according to some embodiments of the present invention. Reference is also made to FIG. 8A and FIG. 8B, which are schematic illustrations of a top view and a bottom view respectively, of electro-mechanical connector 140, according to some embodiments of the present invention. Reference is also made to FIG. 9A, FIG. 9B, FIG. 9C and FIG. 9D, which are schematic illustrations of a front view, enlarged front view, top view and a bottom view respectively, of compatible electro-mechanical connector of UAV 200, according to some embodiments of the present invention. Compatible electro-mechanical connector 210 may be located on a landing gear part of UAV 200, for example, on a landing skid 220 of UAV 200, a leg, and/or any lower part of UAV 200.

Optionally, electro-mechanical connector 140 includes a set of horizontally aligned teeth 141 adapted to be mechanically combined and electrically coupled to a matching set of horizontally aligned teeth 211 of compatible electro-mechanical connector 210. When electro-mechanical connector 140 is moving toward compatible electro-mechanical connector 210, may automatically teeth 141 align with teeth 211.

Figure 9A:
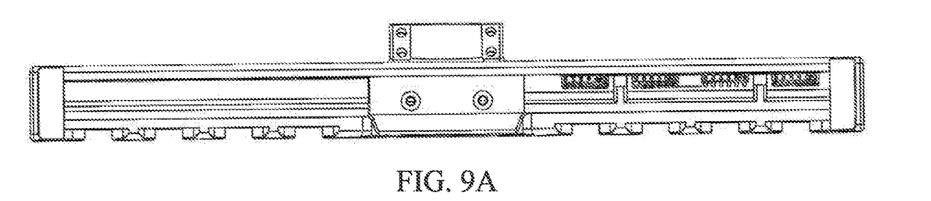
FIG. 9A, FIG. 9B, FIG. 9C and FIG. 9D are schematic illustrations of a front view, enlarged front view, top view and a bottom view respectively, of a compatible electro-mechanical connector of a UAV, according to some embodiments of the present invention.
Figure 9B:
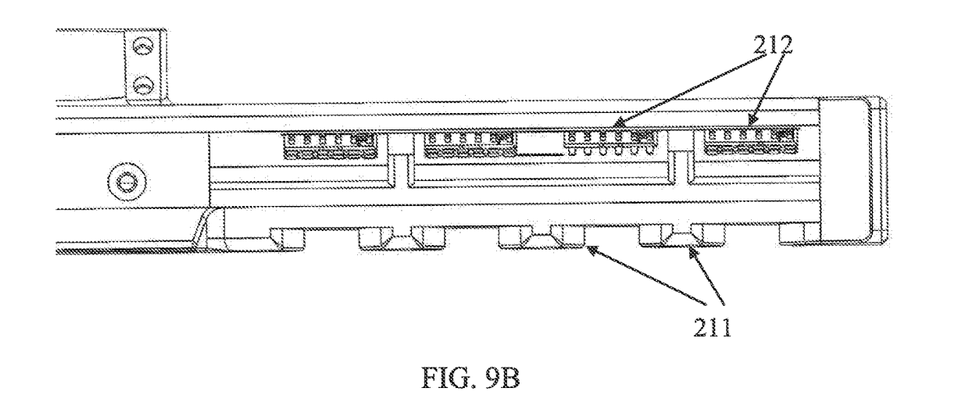
Figure 9C:
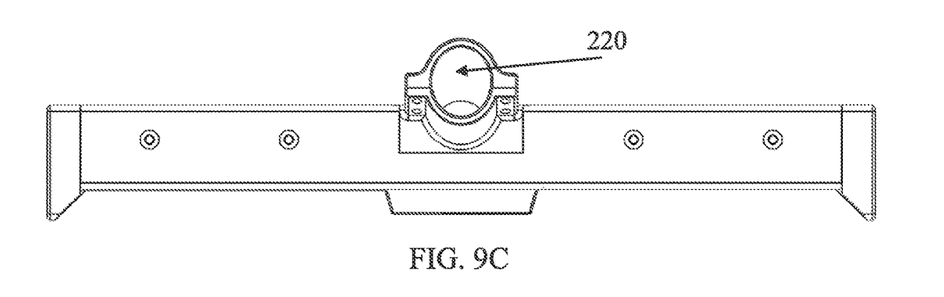
Figure 9D:
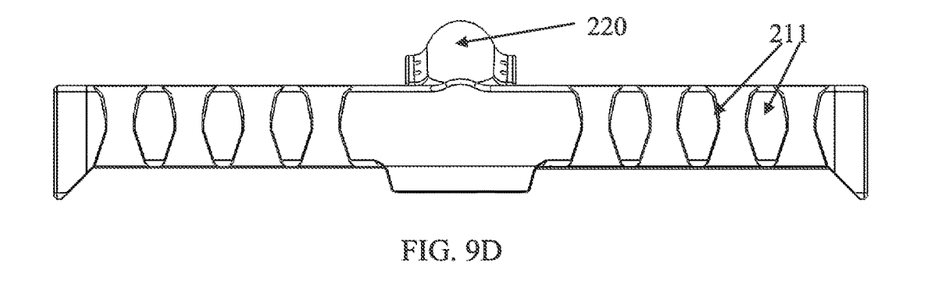

The teeth may be of any shape which allows computability between the sets of teeth. For example, teeth 141 may be horizontal and adjacent to landing surface 110 while teeth 211 may be vertical and perpendicular to landing surface 110 when UAV 200 is landed. Teeth 141 and teeth 211 may be of any shape, for example conically shaped.

Optionally, electric contacts 142 are included in electro-mechanical connector 140 which are compatible with electric contacts 212 included in compatible electro-mechanical connector 210. When the electro-mechanical connectors are connected, electric contacts 142 touch electric contacts 212, and establish an electrical connection between UAV 200 and ground station 100.

Electric contacts 142 may include, for example, at least 12 contacts for at least 12 channels and 2 contacts for a relay, wherein 4 connections are for a power circuit with redundancy functionality, 7 connections for power balancing during the charging procedure functionality, 2 for the switch functionality and 1 connection for the relay functionality. Electric contacts 142 may include data contact, for example between 4 to 8 contacts are used for data transfer. Optionally, electric contacts 142 include contact(s) unique for data.

Optionally, landing surface 110 (or part thereof) is rotating to correct the orientation of UAV 200 so electro-mechanical connector 140 is aligned with compatible electro-mechanical connector 210. This may be done when a wrong orientation is detected, for example by the landing detection controller using for example sensors or wireless communication as described above. Optionally, the orientation of UAV 200 is corrected by pushers 120, for example when the base of UAV 200 is rectangular and pushers 120 are linear and align the edges of the base.

Optionally, as shown at 905, pushers 120 are withdrawn by linear actuators 130 to allow UAV 200 to be removed from ground station 100, for example for a next flight to begin. Electro-mechanical connector 140 is then disconnected from compatible electro-mechanical connector 210. Optionally, pushers 120 are withdrawn gradually, for example, pushing rods 121 and 122 are withdrawn so electro-mechanical connectors 141 and 210 are disconnected, while pushing rods 123 and 124 are still holding UAV 200 from being pulled and dragged by pushing rod 121, and then pushing rods 123 and 124 are withdrawn.

Optionally, ground station 100 includes an enclosure which has an open position and a closed position. The enclosure which may be opened to allow landing of UAV 200, and may be closed when ground station 100 and/or UAV 200 is not in use (when UAV 200 is landed within ground station 100 or when UAV 200 is away from ground station 100).

Optionally, the landing detection controller instructs the enclosure to automatically move into an open position when a landing event is anticipated, and/or move into a closed position when a landing event is detected.

Optionally, when in closed position, the enclosure is durable and protects UAV 200, for example, the enclosure is water proof, dust proof according to IP65 standard, sustains wind up to 20 meters per second and/or configured to prevent UAV 200 from external intentional and/or non-intentional physical damage. The enclosure may be made of strong and light material such as carbon fiber.

Figure 10A:
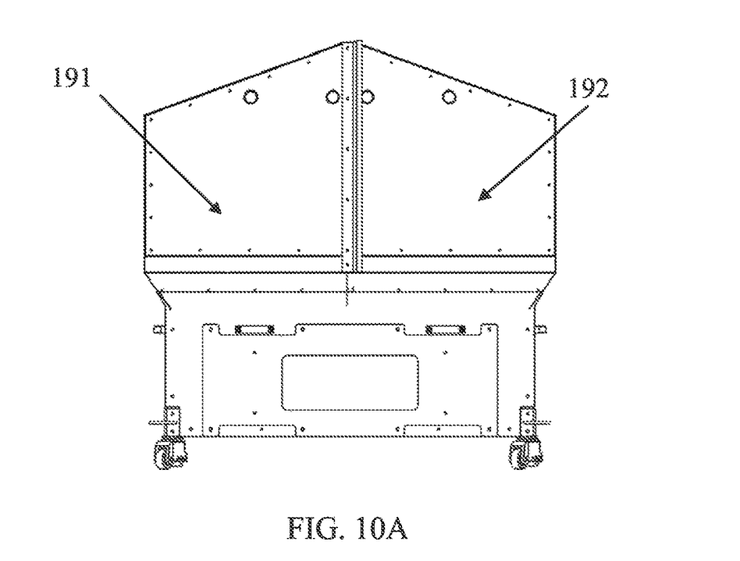
FIG. 10A and FIG. 10B are schematic illustration of side views of a UAV ground station having an enclosure in closed and open positions respectively, according to some embodiments of the present invention.
Figure 10B:
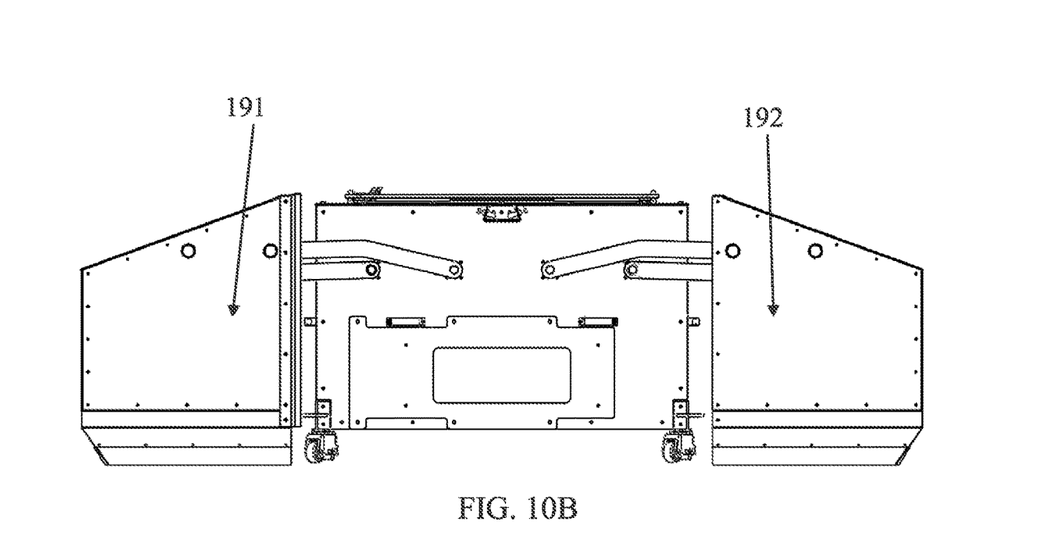

Reference is now made to FIG. 10A and FIG. 10B, which are schematic illustration of side views of UAV ground station having an enclosure in closed and open positions respectively, according to some embodiments of the present invention.

The enclosure may include enclosure parts 191 and 192, which are moved to the sides of ground station 100 when opened. Enclosure parts 191 and 192 may have a shape which fits the shape of the landing surface of the ground station.

Optionally, UAV 200 includes an electronic power switching mechanism. The electronic power switching mechanism transfers the connection of the UAV's power source (such as a battery) from the UAV's components to compatible electro-mechanical connector 210 for charging. This may be controlled by the UAV's power distribution board (PDB). This may be triggered automatically when compatible electro-mechanical connector 210 is connected to electro-mechanical connector 141 and/or when the PDB is instructed by the UAV's processor to get ready for charging, for example when data transferring is completed. The PDB disconnects the power source from the main power rails (which provides power to all electronic components of the UAV) and connects it to compatible electro-mechanical connector 210. This enables connection of a charger on base station 100 to the battery via electro-mechanical connector 140. When withdraw of pushers 120 is detected, the PDB disconnects the battery from compatible electro-mechanical connector 210 and reconnects it to the main power rails. Optionally, the electronic power switching mechanism disconnects the power source from the main power rails and connects it to compatible electro-mechanical connector 210 by detecting closure of a circuit by compatible electro-mechanical connector 210 with ground station 100. The electronic power switching mechanism disconnects the power source to the main power rails when the circuit is opened. The circuit may be opened by disconnecting compatible electro-mechanical connector 210 or by an instruction by the landing detection controller of base station 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant UAVs will be developed and the scope of the term UAV is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An unmanned aerial vehicle (UAV) ground station, comprising:
    a landing surface having a perimeter and a center;
    a plurality of pushers held above said landing surface by a plurality of linear actuators;
    at least one electro-mechanical connector attached to one of said plurality of pushers, mechanically adapted to be electrically connected to a compatible electro-mechanical connector of a UAV; and
    a landing detection controller adapted to instruct said plurality of linear actuators to move said plurality of pushers from said perimeter toward said center when a landing event related to said UAV is detected;
    wherein said electro-mechanical connector includes a set of horizontally aligned teeth adapted to be mechanically combined and electrically coupled to a matching set of horizontally aligned teeth of said compatible electro-mechanical connector.

2. The UAV ground station of claim 1, wherein said plurality of pushers includes at least two horizontally disposed pushing rods and said plurality of linear actuators include a plurality of vertical rods, each of said plurality of vertical rods is attached to an end of one of said at least two horizontally disposed pushing rods.

3. The UAV ground station of claim 1, wherein said plurality of pushers includes a first pair of pushing rods and a perpendicular second pair of pushing rods, wherein said first pair of pushing rods is located above said second pair of pushing rods to allow simultaneous movement of said first and second pairs of pushing rods and toward said center.

4. The UAV ground station of claim 3, wherein said plurality of linear actuators move each of said first pair of pushing rods and said second pair of pushing rods simultaneously from said perimeter toward said center.

5. The UAV ground station of claim 1, wherein said plurality of linear actuators move said plurality of pushers until said UAV is held by said plurality of pushers.

6. The UAV ground station of claim 1, wherein when said UAV is held by said plurality of pushers, said at least one electro-mechanical connector is electrically and mechanically connected to said compatible electro-mechanical connector of said UAV, so said UAV is electronically communicating and electrically charging via said electro-mechanical connector.

7. The UAV ground station of claim 1, further comprising:
    an enclosure having an open position and a closed position;
    wherein said landing detection controller is further adapted to instruct said enclosure to move from said open position to said closed position when said landing event is detected.

8. The UAV ground station of claim 1, further comprising:
    a back-light located below said landing surface and illuminating said landing surface;
    wherein said landing surface is made of semi-transparent material so said landing surface is visible at night from above.

9. The UAV ground station of claim 1, wherein said landing surface is covered with an anti-glare coating to prevent light reflections from said landing surface.

10. An unmanned aerial vehicle (UAV) ground station, comprising:
    a landing surface having a perimeter and a center;
    a plurality of pushers held above said landing surface by a plurality of linear actuators;
    at least one electro-mechanical connector attached to one of said plurality of pushers, mechanically adapted to be electrically connected to a compatible electro-mechanical connector of a UAV; and
    a landing detection controller adapted to instruct said plurality of linear actuators to move said plurality of pushers from said perimeter toward said center when a landing event related to said UAV is detected;
    wherein said UAV includes an electronic power switching mechanism adapted to disconnect a power source of said UAV from electronic components of said UAV and connect said power source to said compatible electro-mechanical connector for charging.

* * * * *